(12) United States Patent
Koessler et al.

(10) Patent No.: US 10,683,079 B2
(45) Date of Patent: Jun. 16, 2020

(54) FLIGHT VEHICLE WING POSITIONING SYSTEM

(71) Applicant: Raytheon Company, Waltham, MA (US)

(72) Inventors: Jeffrey H. Koessler, Tucson, AZ (US); Anthony O. Lee, Tucson, AZ (US); Cody D. Tretschok, Tucson, AZ (US); Gregory J. Artz, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 429 days.

(21) Appl. No.: 15/479,378

(22) Filed: Apr. 5, 2017

(65) Prior Publication Data

US 2018/0290725 A1   Oct. 11, 2018

(51) Int. Cl.
*B64C 3/38* (2006.01)
*B64C 1/22* (2006.01)
(Continued)

(52) U.S. Cl.
CPC .................. *B64C 3/38* (2013.01); *B64C 1/22* (2013.01); *B64C 1/26* (2013.01); *B64C 17/02* (2013.01); *B64C 39/008* (2013.01); *B64C 39/024* (2013.01); *B64C 2201/021* (2013.01); *B64C 2201/10* (2013.01); *B64C 2201/128* (2013.01); *B64C 2201/165* (2013.01); *B64C 2211/00* (2013.01)

(58) Field of Classification Search
CPC .. B64C 3/56; B64C 3/40; B64C 27/26; B64C 39/024; B64C 39/008; B64C 31/032; B64C 2201/201; B64C 2201/102; B64C 2201/128; B64C 2201/165; B64C 2201/028; B64C 2201/084; B64C 3/38; B64C 1/22; B64C 17/00; B64C 2211/00; F42B 10/14; F42B 15/105

See application file for complete search history.

(56) References Cited

U.S. PATENT DOCUMENTS 4,405,102 A    9/1983  Taylor
7,185,847 B1 *  3/2007  Bouchard ............... F42B 10/12
                                                244/3.28
(Continued)

FOREIGN PATENT DOCUMENTS

FR        1 124 991 A     10/1956

OTHER PUBLICATIONS

International Search Report and Written Opinion for corresponding International Application No. PCT/US2017/056309 dated Dec. 20, 2017.

*Primary Examiner* — Medhat Badawi
*Assistant Examiner* — Vicente Rodriguez
(74) *Attorney, Agent, or Firm* — Renner, Otto, Boisselle & Sklar, LLP

(57) ABSTRACT

A control system of a flight vehicle automatically varies the relationship between the center of gravity and the center of pressure of the flight vehicle. The control system automatically adjusts a center of pressure of the flight vehicle depending on a varying payload or payload type that is removably couplable to the flight vehicle. The control system automatically limits translational movement of the one or more wings of the flight vehicle in response to coupling of a payload to a fuselage of the flight vehicle.

18 Claims, 6 Drawing Sheets

(51) Int. Cl.
*B64C 39/02* (2006.01)
*B64C 39/00* (2006.01)
*B64C 17/02* (2006.01)
*B64C 1/26* (2006.01)

(56) References Cited

U.S. PATENT DOCUMENTS

| | | | |
|---|---|---|---|
| 8,809,755 B1 * | 8/2014 | Patel | F42B 19/06 |
| | | | 244/3.26 |
| 2003/0057325 A1 * | 3/2003 | Carroll | B64C 39/024 |
| | | | 244/120 |
| 2010/0059623 A1 | 3/2010 | Cazals et al. | |
| 2010/0282917 A1 * | 11/2010 | O'Shea | B64C 39/024 |
| | | | 244/218 |
| 2016/0009363 A1 * | 1/2016 | Valasek | B64C 1/22 |
| | | | 244/13 |
| 2016/0272319 A1 * | 9/2016 | Hodge | B64D 9/00 |
| 2018/0281924 A1 * | 10/2018 | Grubb | B64C 39/024 |

* cited by examiner

FLIGHT VEHICLE WING POSITIONING SYSTEM

FIELD OF THE INVENTION

The invention relates generally to a wing deployment positioning system for a flight vehicle, and more particularly to a wing deployment positioning system that automatically adjusts a launch position of one or more wings upon coupling of a varying payload or payload type to change the relationship between the center of gravity and the center of pressure of the flight vehicle.

DESCRIPTION OF THE RELATED ART

A flight vehicle typically must have its center of gravity positioned in a certain relationship to its aerodynamic center of pressure, such as for stability or efficiency of flight. With respect to unmanned aerial vehicles, this relationship is often accomplished via a ballast, such as where weight is added to the nose or tail to balance the unmanned aerial vehicle. This ballast can be added manually or sometimes an internal mass can be manually moved. In both instances, a user must check and re-check the center of gravity manually to ensure success of the respective weight placement or adjustment.

SUMMARY OF THE INVENTION

An exemplary control system of a flight vehicle automatically varies the relationship between the center of gravity and the center of pressure of the flight vehicle. The exemplary control system automatically adjusts a center of pressure of the flight vehicle depending on a varying payload or payload type that is removably couplable to the flight vehicle.

For example, the exemplary control system automatically limits translational movement of the one or more wings of the flight vehicle along a central longitudinal axis of the fuselage of the flight vehicle to adjust the center of pressure of the flight vehicle relative to the predetermined center of gravity of the flight vehicle.

In another example, the exemplary control system automatically adjusts a launch position of one or more wings of the flight vehicle relative to the fuselage of the flight vehicle depending on the varying payload or payload type that is removably couplable to the flight vehicle.

According to one aspect, an unmanned flight vehicle includes a fuselage having a forward end and an aft end and the fuselage configured to couple with a payload structure, a wing extending from the fuselage where the wing is configured to deploy from a non-launch position to a launch position, and a wing positioning system engageable with the payload structure and coupled to the fuselage between the forward end and the aft end for carrying the wing. The wing positioning system is configured to translate the wing between the forward and aft ends from the non-launch position to the launch position, where in response to engagement of the wing positioning system with the payload structure the wing positioning system is configured to automatically limit the translational movement of the wing between the non-launch and launch positions.

The wing positioning system may be configured to translate the wing along a central longitudinal axis of the fuselage.

The wing positioning system may be configured to prevent pitch rotation of the wing relative to the fuselage.

The unmanned flight vehicle may further include another wing, where the wing and the another wing are opposed wings extending in opposite directions from the fuselage and each extend between a respective attached end coupled to the wing positioning system and a respective free end spaced from the fuselage upon deployment.

The wing positioning system may include an engagement member for engagement by the wing, where upon coupling of the payload structure with the fuselage the engagement member is movable via engagement with the payload structure to a predetermined position, and where the engagement member in the predetermined position limits the translational movement of the wing via engagement of the wing with the engagement member.

The wing positioning system may further include a carriage carrying the wing, where the engagement member extends between a payload structure coupling location of the fuselage and an opposing end of the fuselage, and where the carriage is engageable with the engagement member in the predetermined position to limit the translational movement of the wing.

The engagement member may be movable along a central longitudinal axis of the fuselage in response to coupling of the payload structure with the fuselage.

The engagement member may include a hard stop protrusion shaped for engagement by the wing to limit the translational movement of the wing.

The wing positioning system may further include a plurality of stop protrusions disposed at predetermined positions between the forward and aft ends of the fuselage, where the engagement member is shaped to move one of the stop protrusions at a time from a default position to a position engageable by the wing upon engagement of the engagement member by the payload structure.

The unmanned flight vehicle may be in combination with the payload structure, the payload structure being removably couplable to the fuselage and engageable with the wing positioning system upon the coupling of the payload structure with the fuselage.

The payload structure may include an indexing projection that engages the wing positioning system causing a component of the wing positioning system to move to a predetermined position.

The wing positioning system may be configured to limit the translational movement of the wing to a plurality of predetermined launch positions in response to engagement with a respective plurality of different payload structures.

The wing positioning system may include a biasing member against which the payload structure acts when coupled to the fuselage.

According to another aspect, an unmanned flight vehicle includes a fuselage configured to couple with a payload structure thereto, a wing extending from the fuselage and configured to deploy from a non-launch position to a launch position, and a control system coupled to the fuselage between the forward and aft ends and configured to automatically control a center of pressure of the flight vehicle in response to engagement of the control system with a payload structure.

The control system may be a wing positioning system for carrying the wing, the wing positioning system being configured to limit movement of the wing to a plurality of predetermined launch positions to control the center of pressure of the flight vehicle.

The wing positioning system may be configured to prevent pitch rotation of the wing relative to the fuselage.

The control system may be configured to move a component of the flight vehicle to a predetermined position, which position is set in response to engagement of the payload structure with the fuselage.

According to yet another aspect, an unmanned flight vehicle includes a fuselage extending along a central longitudinal axis between a forward end and an aft end, a payload structure removably coupled to fuselage, and opposed wings deployable relative to and coupled to the body by a wing positioning system. The wing positioning system includes a housing coupled to the body and a carriage coupled to respective ends of the opposed wings and being translatable with the opposed wings along the housing along the central longitudinal axis. The wing positioning system also includes a movable engagement member that limits the extent which the carriage and opposed wings are translatable along the central longitudinal axis, where the engagement member is engageable by the payload structure upon its coupling to the fuselage to move the engagement member to a predetermined position providing the translational limit of the opposed wings along the central longitudinal axis.

The payload structure may include an indexing projection that engages and moves the engagement member of the wing positioning system to the respective predetermined position.

The wing positioning system may be configured to prevent pitch rotation of the opposed wings relative to the fuselage.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the disclosure.

DETAILED DESCRIPTION

The present invention provides an unmanned flight vehicle, also herein referred to as a flight vehicle, an unmanned aerial vehicle, or a UAV. The flight vehicle has a fuselage that is configured to couple with a plurality of different payloads or payload types depending on mission objectives or needs of the flight vehicle. The flight vehicle includes a control system for adjusting a relationship of the center of pressure of the flight vehicle and the center of gravity of the flight vehicle depending on which of the plurality of payloads or payload types is coupled to the fuselage of the flight vehicle. In particular, the control system is configured to automatically adjust the center of pressure of the flight vehicle depending on the payload or payload type to provide for maximum stability and maneuverability during flight of the flight vehicle.

It will be appreciated that while the features disclosed herein are described with respect to unmanned flight vehicles, the embodiments may also be applicable to any other flight vehicle such as a manned flight vehicle or a projectile. The features disclosed herein may also be applicable to non-flight vehicles such as any vehicle having wings, foils or stabilizers extending from a main body, such as a watercraft or even an air-driven ground vehicle.

Figure 1:
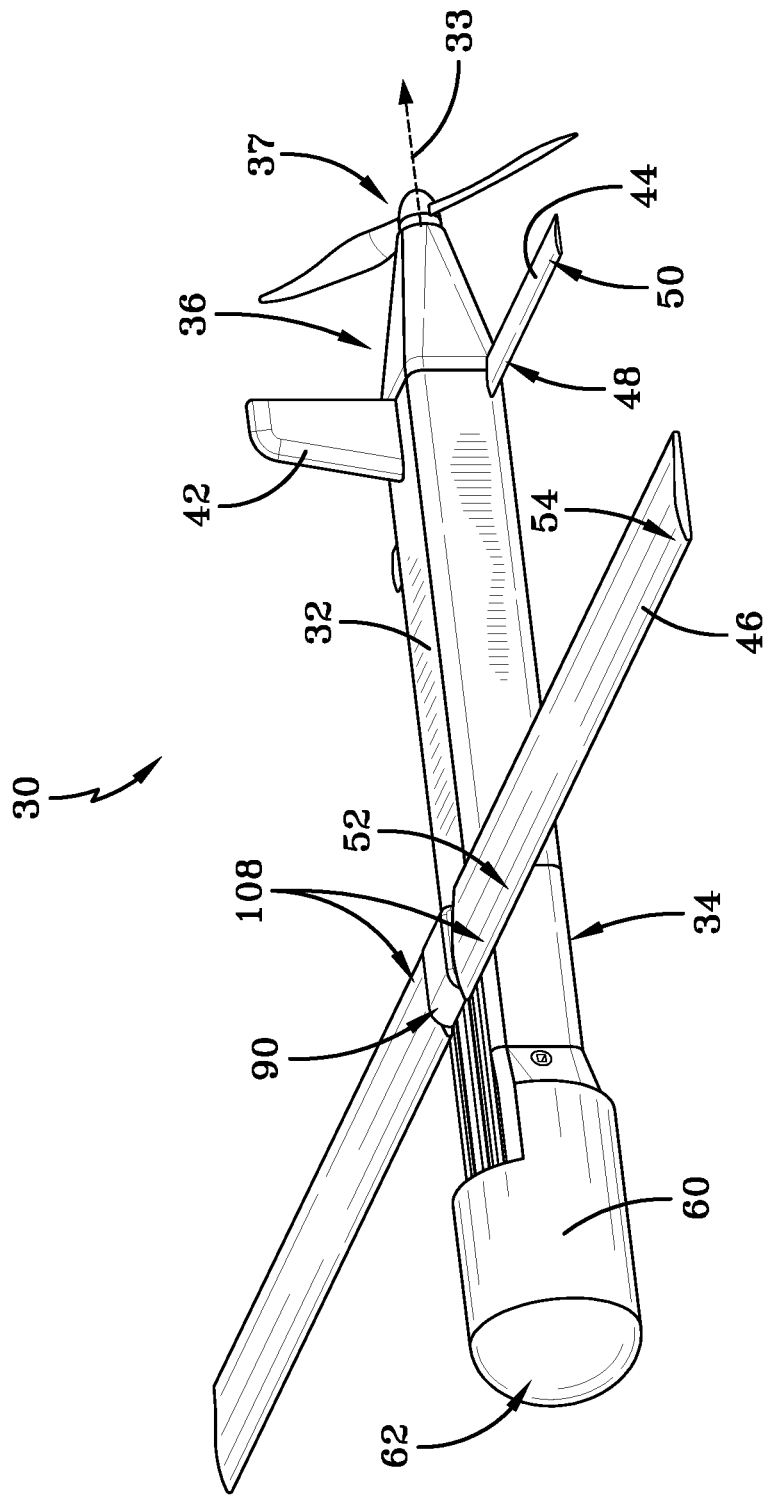
FIG. 1 is an environmental view of a flight vehicle including a payload structure and a fuselage.
Figure 2:
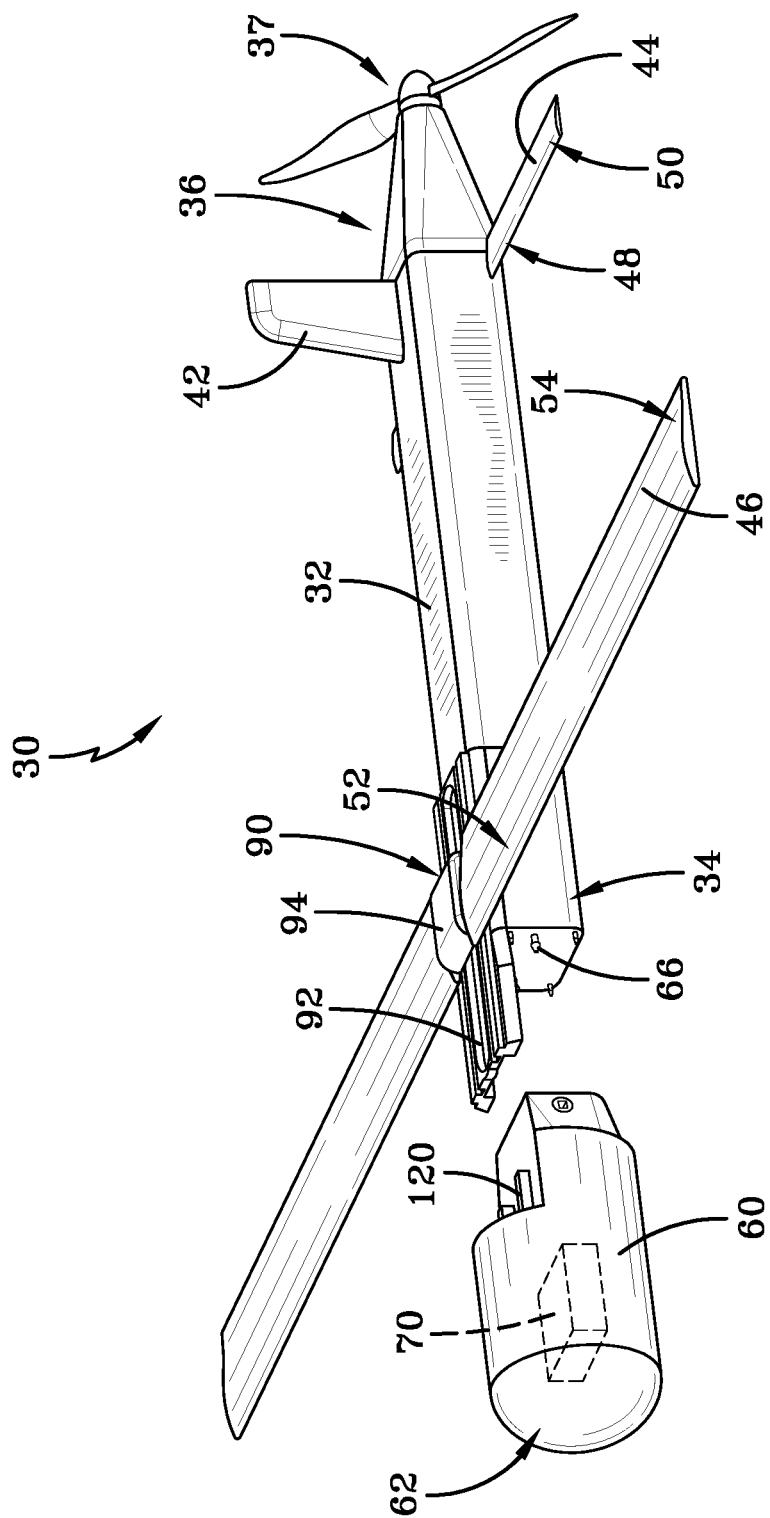
FIG. 2 is another environmental view showing the payload structure and the fuselage of FIG. 1 separated from one another.

Turning first to FIGS. 1 and 2, an exemplary flight vehicle is illustrated at 30. The illustrated flight vehicle 30 is an unmanned aerial vehicle, often referred to as a drone. The flight vehicle 30 has a fuselage 32, also herein referred to as a body, that extends along a central longitudinal axis 33 between a forward end 34 and an aft end 36. It will be appreciated that while the fuselage 32 is depicted as having a rectangular cross-section, the fuselage 32 may have any suitable shape and length in other embodiments.

The aft end 36 includes a propulsion device 37, such as a motor-driven propeller. In some embodiments, a different propulsion device may be additionally or alternatively included, such as a cool or hot air jet. It will also be appreciated that another location of the fuselage 32, such as the forward end 34, may alternatively or additionally include a propulsion device in some embodiments.

Coupled to the fuselage 32 are a plurality of wings, including a rear tail fin 42, a set of opposed rear wings 44, and a set of opposed forward wings 46 that together provide for maneuverability and lift of the flight vehicle 30. The rear tail fin 42 extends from the fuselage 32 in a direction orthogonal to the central longitudinal axis 33. Each of rear wings 44 extends outwardly from the fuselage 32 in respective directions orthogonal to the central longitudinal axis 33, and extends between a respective attached end 48 and a free end 50 spaced form the fuselage 32 upon deployment.

As shown, the set of forward wings 46 is movable with respect to the fuselage 32, providing for deployability of the flight vehicle 30 from a non-launch state shown in FIG. 2 to the illustrated launch state shown in FIG. 1. Each of the forward wings 46 extends outwardly from the fuselage 32 in respective directions orthogonal to the central longitudinal axis 33, and extends between a respective attached end 52 and a free end 54 spaced from the fuselage 32 upon deployment.

As used herein, coupling may refer to a direct coupling of components or to an indirect coupling of components, such as via an intervening component disposed therebetween.

It will be appreciated that any suitable number of wings or fins may be included in other embodiments, and that such wings or fins may be suitably located along the respective fuselage.

In some embodiments, any of the tail fin 42, rear wings 44 or forward wings 46 may be deployable, such as rotatably deployable, from a stowed configuration adjacent the fuselage 32 to a non-stowed position spaced from the fuselage 32, such as to provide a smaller footprint for stowage. Such configuration may allow for tube launching of the flight vehicle 30, for example.

The depicted flight vehicle 30 further includes a payload, herein referred to as a payload structure 60, at the forward end 34 of the fuselage 32. The payload structure 60 is couplable, such as removably couplable, to the fuselage 32. Different payload structures 60 may be attached depending on mission objectives of the flight vehicle. For example, different payload structures 60 may include one or more of a camera, kinetic effectors, aerial communications relay, weapons, or an optical, radio frequency, chemical, biological, agricultural, hyperspectral, weather mining, mapping, or magnetic sensor.

Each different payload structure 60 may be aerodynamically shaped for enabling efficient flight of the flight vehicle 30. For example, the depicted payload structure 60 includes a domed forward end 62.

Each payload structure 60 is configured, such as being shaped at its aft end 64, to couple to the fuselage 32. In the depicted illustration, the depicted payload structure 60 is received by the fuselage 32. The depicted fuselage 32 is configured, such as being shaped at its forward end 34, to receive the payload structure 60. The payload structure 60 and the fuselage 32 are removably couplable to one another by any one or more suitable methods, such as pins, fasteners, bolted plates extending between the payload structure 60 and fuselage 32, etc. As shown in FIG. 2, pins 66 are included for initial coupling with bolts (not shown) providing further securement.

In other embodiments, one or both of a payload structure 60 and the fuselage 32 may be at least partially received by one another. In other embodiments, a payload structure may be alternatively or additionally coupled at any other suitable location of the fuselage 32, such as at the aft end 36.

To control flight and propulsion of the flight vehicle 30, the depicted payload structure 60 includes a command system 70. The command system 70 may include any suitable components such as a processor, communications relay, power supply, etc. for enabling command functions, such as navigational control, propulsion control, and communications. The command system 70 may be fully or partially autonomous. Where the command system 70 is not fully autonomous it may receive external control communications. It will also be appreciated that in other embodiments, a command system may be alternatively or additionally located in the fuselage 32.

To account for varying weights and weight distributions of different coupled payload structures 60, and thus to allow for variations in the relationship between the center of gravity of and the center of pressure of the flight vehicle 30 based on these different payload structures 60, the flight vehicle 30 further includes a control system 90. The control system 90 is configured to deploy the forward wings 46 while limiting the movement of the forward wings 46 to a predetermined launch position, to control the center of pressure of the flight vehicle 30 depending on the particular payload structure 60 coupled to the fuselage 32.

To accomplish this control of the center of pressure of the flight vehicle 30, the depicted control system 90 includes components that automatically adjust the launch position of the forward wings 46 in response to engagement of the control system 90 with one or more components of a particular payload structure 60. It is noted that the depicted control system 90 controls adjustment of the launch position to a plurality of predetermined positions depending on which payload structure 60 is coupled to the fuselage 32.

The adjustability of the launch position of the forward wings 46 is automatic based on engagement of one or more components of the payload structure 60 with the one or more components of the control system 90, and thus adjustability of the launch position does not require a communication command from the command center 70. It will be appreciated, however, that in alternative embodiments, the command center 70 may provide an initial deploy command to the control center to release a respective latch and deploy the forward wings 46 from the non-launch position.

Figure 3:
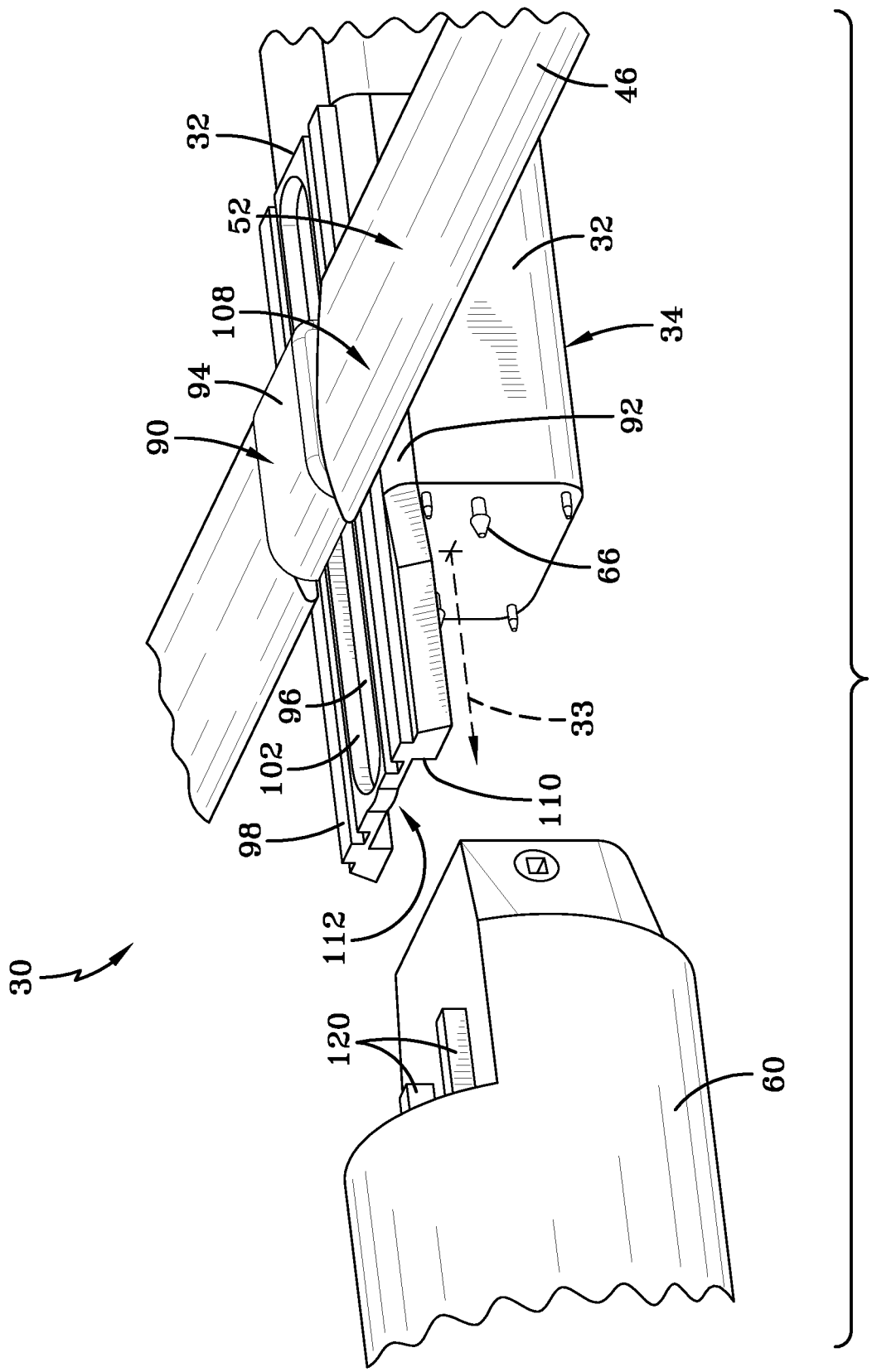
FIG. 3 is a partial magnified view of the flight vehicle as shown in FIG. 2.
Figure 4:
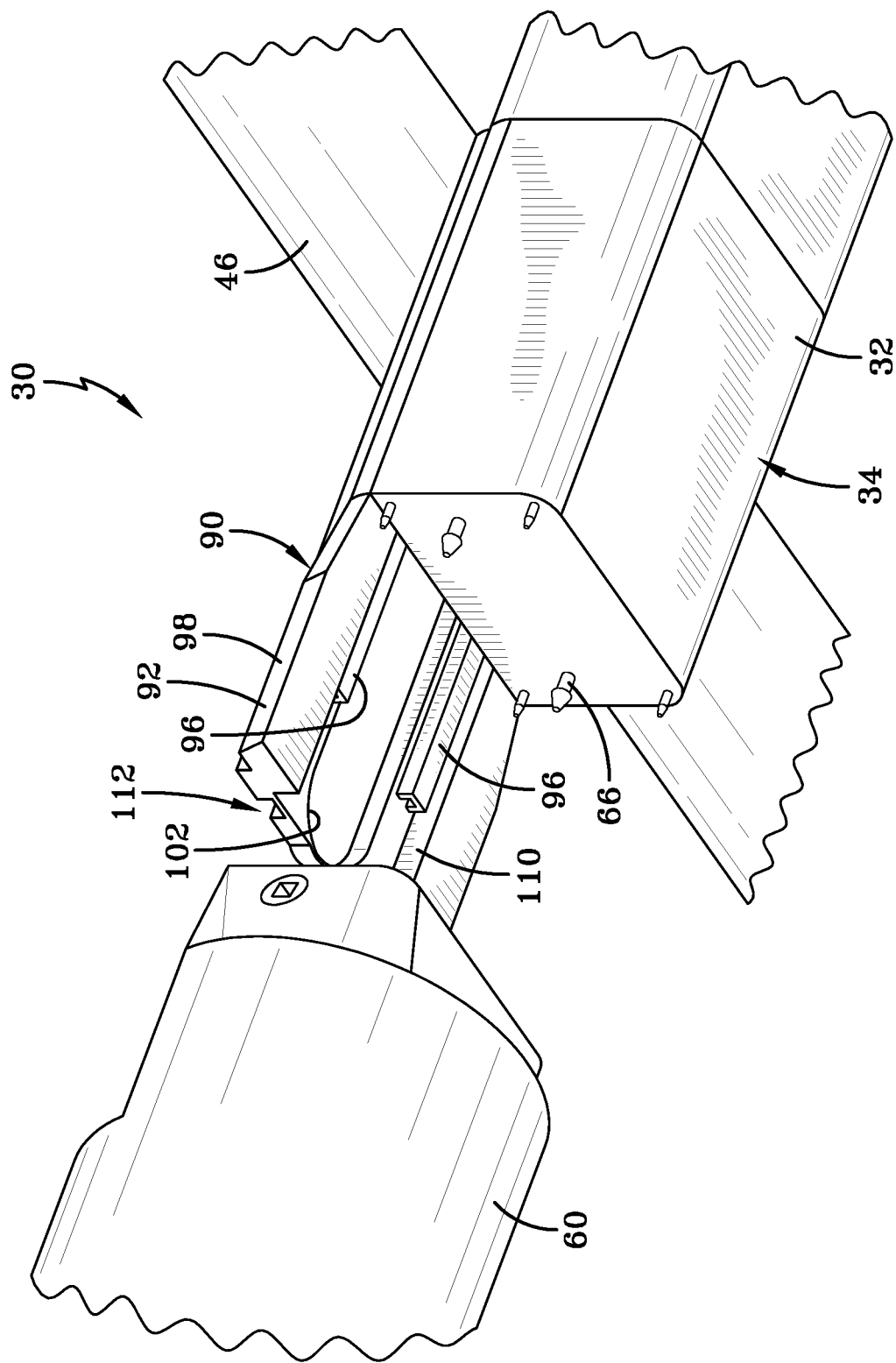
FIG. 4 is a partial magnified view from the bottom of the flight vehicle as shown in FIG. 2.
Figure 5:
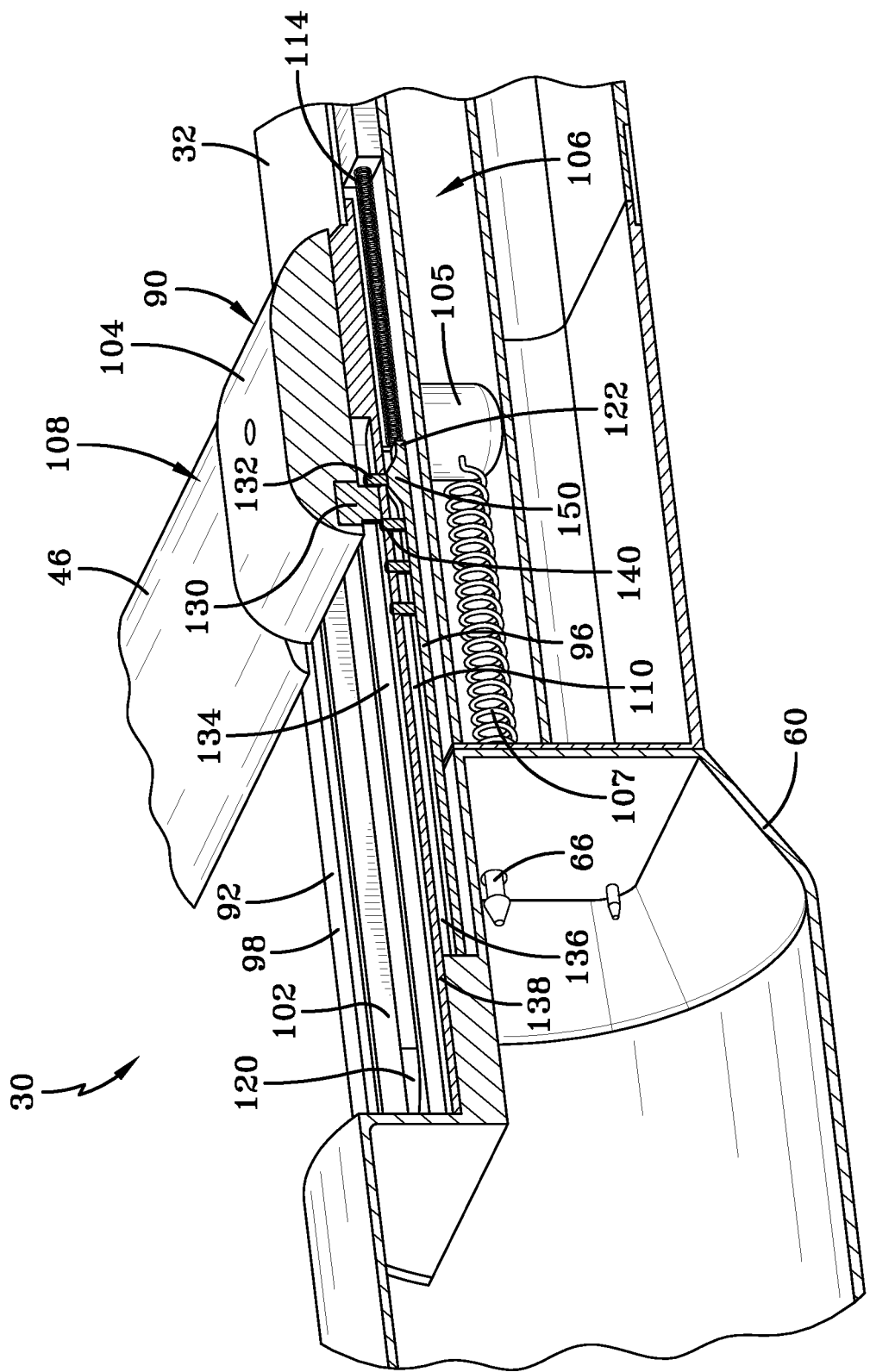
FIG. 5 is a partial magnified cross-sectional view of the flight vehicle as shown in FIG. 1, showing components of a wing positioning system of the flight vehicle.

Turning now to FIGS. 3-5, the control system 90 is coupled to the fuselage 32 between the forward end 34 and the aft end 36. The control system 90, which is also herein referred to as the wing positioning system 90, includes a housing 92, a carriage 94, and at least one engagement member 96. Together, the components of the wing positioning system 90 enable translation of the forward wings 46 between the forward end 34 and the aft end 36 of the fuselage. Likewise, the components of the wing positioning system 90 are configured to automatically limit this translational movement of the wings 46 in response to engagement of the wing positioning system 90 with the payload structure 60.

As shown, the housing 92 is coupled to the fuselage 90, such as via fasteners (not shown). A top portion 98 of the housing 92 includes a slot 102 for receiving the carriage 94 and for allowing translation of the carriage 94 along the central longitudinal axis 33. In other embodiments, the top portion 98 of the housing 92 may instead include a key received in a slot of the carriage 94.

The carriage 94 includes a carriage upper main body 104 that is received by and translates along the slot 102, and a carriage lower main body 105 that is received by and translates along an inner slot 106 defined by a lower portion of the housing 92. A carriage biasing member 107, such as a spring, is disposed in the slot 106 and biases the carriage 94 towards the aft end 36 of the fuselage 32.

The attached ends 52 of the opposed forward wings 46 are coupled to, such as being received by, the carriage upper main body 104. This coupling allows for carrying and translation of the wings 46 by the wing positioning system 90 along the central longitudinal axis 33. The coupling of the attached ends 52 of the wings 46 to the carriage 94 is a fixed coupling that prevents pitch rotation of the wings 46 relative to the fuselage 32. Additionally, in the depicted embodiment, an inner portion 108 of the forward wings 46 at the attached ends 52 is disposed against and translates along the housing 92. This positioning aids in restricting or altogether preventing pitch rotation of the wings 46 relative to the fuselage 32. The engaged portions of the wings 46 and/or the fuselage 32 may be otherwise shaped in other embodiments In the non-launch position of the wings 46, the carriage 94 is disposed at the forward end 34 of the fuselage 32 (see, e.g., FIG. 2). For example, the carriage 94 and housing 92 may include corresponding latching portions (not shown) to maintain the carriage 94 at the forward end 34 against a biasing force of the biasing member 107, which is provided to enable movement of the carriage 94 to its default launch position(s). Upon coupling of the payload structure 60 to the fuselage 32, the carriage 94 is moved towards the aft end 36 along the central longitudinal axis 33, aided by the biasing member 107. For example, the payload structure 60 may be shaped to engage the latching portion of one or both of the carriage 94 or the housing 92 to de-latch the latching portions and enable movement of the carriage 94 aided by the biasing member 107.

Further included in the wing positioning system 90 are two opposed engagement members 96, though any suitable number may be included in other embodiments. The engagement members 96 are movable to limit the extent which the carriage 94 and the opposed forward wings 46 are translatable along the central longitudinal axis 33 to their respective launch position. The engagement members 96 limit the movement of the carriage 94 and forward wings 46 by providing for a pre-movable stop with which the forward wings 46 engage via engagement of the carriage 94 with the engagement members 96.

The engagement members 96 move, such as translate, along the central longitudinal axis 33 in channels 110 of the top portion 98 of the housing 92. The engagement members 96 extend between an open end 112 of the wing positioning system 90 and the aft end 36 of the fuselage 32. A biasing member 114, such as a spring, biases each engagement member 96 towards the open end 112. The biasing member 114 may provide a force in the range of about 1 lbf to about 10 lbf, for example, such as about 2 lbf.

The open end 112 of the wing positioning system 90 is disposed at the forward end 34 of the fuselage 32 and is shaped for receiving the payload structure 60. The channels 110 are open at the open end 112 and are closed by the aft end 64 of the payload structure 60 upon its coupling with the fuselage 32. It will be appreciated that the payload structure 60 may couple directly to the fuselage 32 or instead may couple indirectly to the fuselage 32 via direct coupling to the wing positioning system 90, which is in turn coupled to the fuselage 32, as depicted.

The open ends of the channels 110 are each shaped to receive an indexing projection 120 extending from the payload structure 60. The indexing projections 120 are configured, such as via their length, to counter a biasing force of the biasing members 114 and to move the engagement members 96 a predetermined distance along the channels 110 in a direction towards the aft end 36 upon installation and securement of the payload structure 60. Thus the biasing members 114 conversely provide bias against the payload indexing projections 120. The length of the indexing projections 120 are predetermined depending on a predetermined weight and weight distribution of the payload structure 60 and on the effect of the payload structure 60 on the location of the center of gravity of the flight vehicle 30 including the payload structure 60.

The length of the indexing projections 120 aids in defining the center of pressure of the assembled flight vehicle 30 (including the payload structure 60), by aiding in defining the launch position of the forward wings 46. Upon coupling of the payload structure 60 with the fuselage 32 and engagement of the indexing projections 120 with the engagement members 96, the engagement members 96 are movable along the channels 110 against a force of the biasing members 114. This movement provides for movement of the engagement members 96, and particularly aft ends 122 of the engagement members 96, to respective predetermined positions providing the translational limit of the opposed forward wings 46 along the central longitudinal axis 33.

Turning now in particular to FIG. 5, the translational limit is provided when a cam follower, such as a stop member 130, of the carriage 94 moves in a direction from the forward end 34 towards the aft end 36 and into engagement with a stop protrusion 132, providing a hard stop for the forward wings 46. The stop member 130 is coupled to the carriage upper main body 104, such as via a fastener (not shown). The stop protrusion 132 is provided at the predetermined position due to the engagement of the engagement members 96 with the indexing projections 120 and is shaped for engagement by the wings 46 via the stop member 130.

Opposed stop members 130 are translatable along upper portions 134 of the channels 110 opposite the engagement members 96, which translate in lower portions 136 of the channels 110. A channel center wall 138 separates each upper portion 134 from a respective lower portion 136. Center wall openings 140 enable opposing stop protrusions 132 to extend into respective upper portions 134 from respective lower portions 136.

More particularly, as shown in FIG. 5, the wing positioning system 90 is indexed such that there are a finite number of predetermined locations along the central longitudinal axis 33 to which the launch position of the wings 46 may be limited. Opposed sets of stop protrusions 132 are included, each having a plurality of stop protrusions 132, such as four pins 132. The pins 132 extend at least partially from the lower portions 136 into respective through holes 140 in the center walls 138 at four indexed locations along the central longitudinal axis 33 between the forward end 34 and the aft end 36. The pins 132 are biased in the default positions absent from the upper portions 134 via pin biasing members (not shown) coupled to the pins 132 and the top portion 98 of the housing 92.

To engage and raise the stop protrusions 132, the engagement members 96 each include forward and rear camming portions 150 having an inclined segment, in particular a smooth cam segment, for engaging a lower part of the stop protrusions 132, one at a time, and raising the stop protrusions 132 further into respective through holes 140 and into the respective upper portion 134.

Where the camming portions 150 of the engagement members 96 are moved to a predetermined location further aft than the forward-most stop protrusion 132, the passed pins 132 will be allowed to return to their default positions removed from the respective upper portions 134. In such case, the camming portions 150 move past the first pins 132 in a direction towards the aft end 136 and the pin biasing members bias the respective pins 132 out of the upper portions 134. Further, each camming portion 150 is shaped to engage only one stop protrusion 132 at a time.

For example, as shown in FIG. 5, the illustrated camming portion 150 has been moved to the aft-most indexed predetermined position of the aft-most stop protrusion 132. The illustrated stop member 130 is engaged with the aft-most stop protrusion 132. The carriage biasing member 107 acts to maintain the carriage 94 spaced from the forward end 34 of the fuselage 32.

Figure 6:
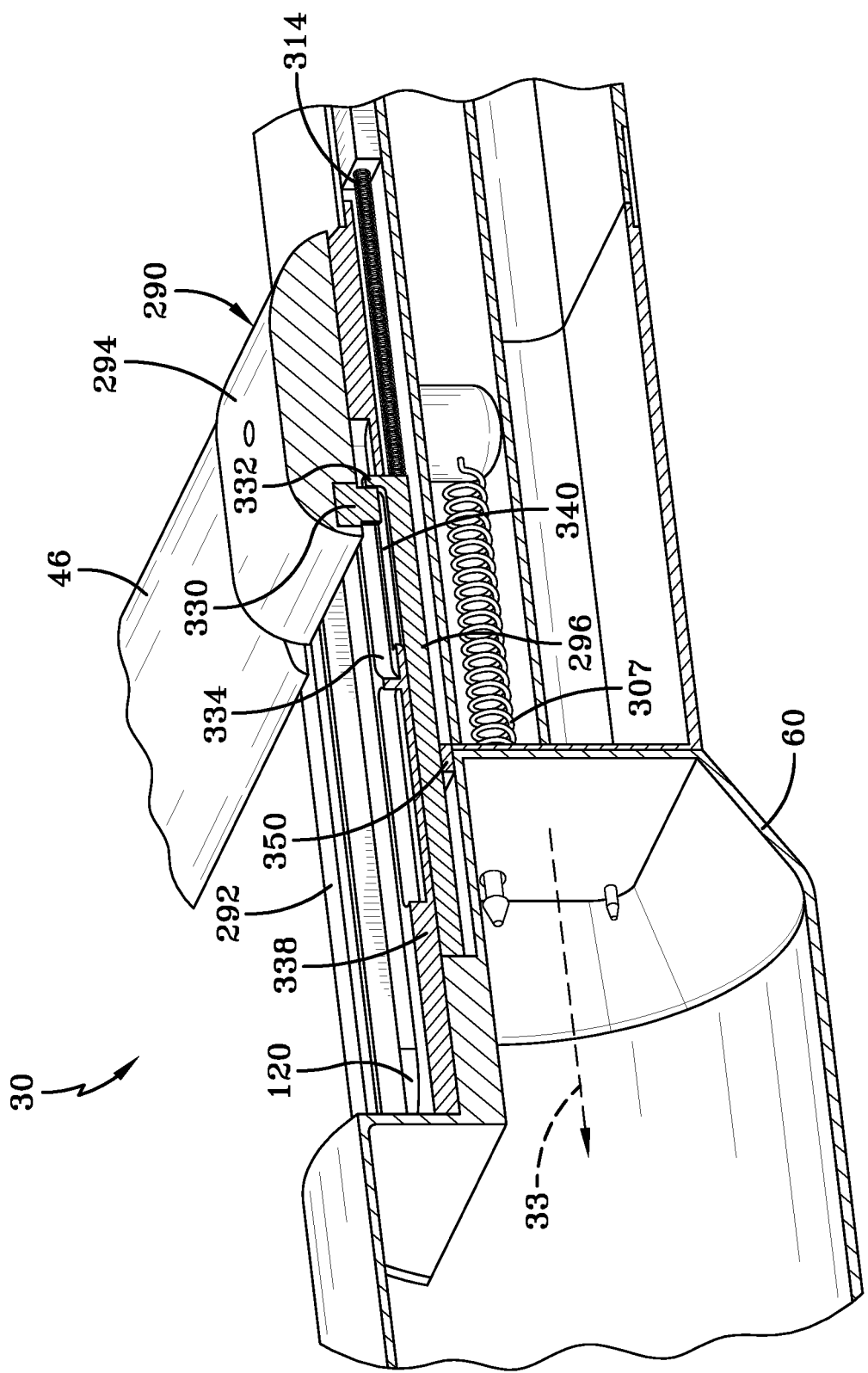
FIG. 6 is a partial magnified cross-sectional view of a flight vehicle, showing components of another wing positioning system of the flight vehicle.

Turning now to FIG. 6, another embodiment of a wing positioning system is shown at 290 for use with the flight vehicle 30. The wing positioning system 290 is substantially the same as the above-referenced wing positioning system 90, and consequently the same reference numerals but indexed by 200 are used to denote structures corresponding to similar structures in the wing positioning system 90. In addition, the foregoing description of the wing positioning system 90 is equally applicable to the wing positioning system 290 except as noted below. Moreover, it will be appreciated upon reading and understanding the specification that aspects of the wing positioning systems 90 and 290 may be substituted for one another or used in conjunction with one another where applicable.

The wing positioning system 290 includes a housing 292, carriage 294 and opposed engagement members 296. The engagement members 296 each include integral therewith a stop protrusion 332 for engagement by opposed stop members 330 to provide the translational limit for movement of the carriage 294 and the forward wings 46. The stop protrusions 332 extend upwardly through a slot 340 in the channel center wall 338 for engagement with the stop members 330, which translate in the channel upper portions 334. In view of omission of predetermined indexed locations, the stop protrusions 332 may be moved to any suitable deployment location of the forward wings 46 upon engagement of the indexing projections 20 with the engagement members 296.

In use, a biasing member 314, such as a spring, biases each engagement member 296 towards the forward end of the fuselage 232. A carriage biasing member 307, such as a spring, provides a biasing force to move the carriage 294 to its launch default location. A locking member 350, such as a wedge lock, may be included in one or both of the fuselage 232 and the payload structure 60 to secure each engagement member 296 relative to the channel upper portions 334.

In the embodiment of FIG. 6, a pair of opposed locking members are included in the payload structure 60 and are configured to translate in directions generally orthogonal to the center axis 33 to allow for movement into and out of engagement with the respective engagement members 296. The locking members 350 secure the engagement members 296 against aft-ward movement against the biasing members 314 and away from the indexing projections 120 in response to engagement of the stop members 330 with the stop protrusions 332 and/or external forces acting on the wings 46. In other embodiments, a single locking member 350 may act on both engagement members 296.

In summary, an exemplary control system 90, 290 of a flight vehicle 30 automatically varies the relationship between the center of gravity and the center of pressure of the flight vehicle 30. The control system 90, 290 automatically adjusts a center of pressure of the flight vehicle 30 depending on a varying payload 60 or payload type that is removably couplable to the flight vehicle 30. The control system 90, 290 automatically limits translational movement of the one or more wings 46 of the flight vehicle 30 in response to coupling of a payload 60 to a fuselage 32 of the flight vehicle 30.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, stores, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An unmanned flight vehicle comprising:
a fuselage having a forward end and an aft end and the fuselage configured to couple with a payload structure;
a wing extending from the fuselage, where the wing is configured to deploy from a non-launch position to a launch position; and
a wing positioning system engageable with the payload structure and coupled to the fuselage between the forward end and the aft end for carrying the wing, the wing positioning system being configured to translate the wing between the forward and aft ends from the non-launch position to the launch position, wherein in response to mechanical engagement of the wing positioning system with the payload structure the wing positioning system is configured to automatically limit the translational movement of the wing between the non-launch and launch positions by a predetermined amount based on the mechanical engagement of the wing positioning system with the payload structure.

2. The unmanned flight vehicle of claim 1, wherein the wing positioning system is configured to translate the wing along a central longitudinal axis of the fuselage.

3. The unmanned flight vehicle of claim 1, wherein the wing positioning system is configured to prevent pitch rotation of the wing relative to the fuselage.

4. The unmanned flight vehicle of claim 1, further including another wing, wherein the wing and the another wing are opposed wings extending in opposite directions from the fuselage and each extending between a respective attached end coupled to the wing positioning system and a respective free end spaced from the fuselage upon deployment.

5. The unmanned flight vehicle of claim 1,
wherein the wing positioning system includes an engagement member for engagement by the wing,
wherein upon coupling of the payload structure with the fuselage the engagement member is movable via engagement with the payload structure to a predetermined position determined by engagement of the engagement member with an indexing projection of the payload structure as the payload structure and the fuselage are coupled together, and
wherein the engagement member in the predetermined position limits the translational movement of the wing via engagement of the wing with the engagement member.

6. The unmanned flight vehicle of claim 5, wherein the wing positioning system further includes a carriage carrying the wing, wherein the engagement member extends between a payload structure coupling location of the fuselage and an opposing end of the fuselage, and wherein the carriage is engageable with the engagement member in the predetermined position to limit the translational movement of the wing.

7. The unmanned flight vehicle of claim 5, wherein the engagement member is movable along a central longitudinal axis of the fuselage in response to coupling of the payload structure with the fuselage.

8. The unmanned flight vehicle of claim 5, wherein the engagement member includes a hard stop protrusion shaped for engagement by the wing to limit the translational movement of the wing.

9. The unmanned flight vehicle of claim 5, wherein the wing positioning system further includes a plurality of stop protrusions disposed at predetermined positions between the forward and aft ends of the fuselage, and wherein the engagement member is shaped to move the stop protrusions one at a time from a default position to a position engageable by the wing upon engagement of the engagement member by the payload structure.

10. The unmanned flight vehicle of claim 1, in combination with the payload structure, the payload structure being removably couplable to the fuselage and engageable with the wing positioning system upon the coupling of the payload structure with the fuselage.

11. The unmanned flight vehicle of claim 10, wherein the wing positioning system includes an engagement member for engagement by the wing;

wherein the payload structure includes an indexing projection that engages the wing positioning system causing the engagement member of the wing positioning system to move to a predetermined position;

wherein upon coupling of the payload structure with the fuselage the engagement member is movable via engagement with the indexing projection to a predetermined position as the payload structure and the fuselage are coupled together; and wherein the engagement member in the predetermined position limits the translational movement of the wing via engagement of the wing with the engagement member.

12. The unmanned flight vehicle of claim 1, wherein the wing positioning system is configured to limit the translational movement of the wing to a plurality of predetermined launch positions in response to engagement with a respective plurality of different payload structures.

13. The unmanned flight vehicle of claim 1, wherein the wing positioning system includes a biasing member against which the payload structure acts when coupled to the fuselage.

14. An unmanned flight vehicle comprising:

a fuselage configured to couple with a payload structure;

a wing extending from the fuselage and configured to deploy from a non-launch position to a launch position; and a control system coupled to the fuselage between the forward and aft ends;

wherein the control system is configured to automatically control a center of pressure of the flight vehicle in response to engagement of the control system with a payload structure;

wherein the control system is configured to move a component of the flight vehicle to a predetermined position, which position is set in response to engagement of the payload structure with the fuselage, with an indexing projection of the payload structure pressing against and translating an engagement member of the control system.

15. The unmanned flight vehicle of claim 14, wherein the control system is a wing positioning system for carrying the wing, the wing positioning system being configured to limit movement of the wing to a plurality of predetermined launch positions to control the center of pressure of the flight vehicle.

16. The unmanned flight vehicle of claim 15, wherein the wing positioning system is configured to prevent pitch rotation of the wing relative to the fuselage.

17. An unmanned flight vehicle comprising:

a fuselage extending along a central longitudinal axis between a forward end and an aft end;

a payload structure removably coupled to fuselage; and opposed wings deployable relative to and coupled to the fuselage by a wing positioning system, wherein the wing positioning system includes a housing coupled to the fuselage, a carriage coupled to respective ends of the opposed wings and being translatable with the opposed wings along the housing along the central longitudinal axis, a movable engagement member that limits the extent which the carriage and opposed wings are translatable along the central longitudinal axis, wherein the engagement member is engageable by the payload structure upon coupling of the payload structure to the fuselage, to move the engagement member to a predetermined position providing the translational limit of the opposed wings along the central longitudinal axis, and wherein the payload structure includes an indexing projection that mechanically engages and moves the engagement member of the wing positioning system to the respective predetermined position automatically as part of the coupling together of the payload structure and the fuselage.

18. The unmanned flight vehicle of claim 17, wherein the wing positioning system is configured to prevent pitch rotation of the opposed wings relative to the fuselage.

* * * * *